United States Patent
Rowe (10) Patent No.: US 11,689,119 B2
(45) Date of Patent: *Jun. 27, 2023

(54) VARIABLE STIFFENING DEVICE COMPRISING ELECTRODE STACKS IN A FLEXIBLE ENVELOPE

(71) Applicant: Toyota Motor Engineering & Manufacturing North America, Inc., Plano, TX (US)

(72) Inventor: Michael P. Rowe, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/465,951

(22) Filed: Sep. 3, 2021

(65) Prior Publication Data

US 2021/0399651 A1   Dec. 23, 2021

Related U.S. Application Data

(63) Continuation of application No. 16/778,011, filed on Jan. 31, 2020, now Pat. No. 11,139,755.

(51) Int. Cl.
  *H02N 1/00*   (2006.01)
(52) U.S. Cl.
  CPC .................................. *H02N 1/002* (2013.01)
(58) Field of Classification Search
  CPC ...................................................... H02N 1/002
  See application file for complete search history.

(56) References Cited

U.S. PATENT DOCUMENTS 6,359,757 B1 *  3/2002  Mallary ............... G11B 5/5552
6,586,859 B2    7/2003  Kornbluh et al.
(Continued)

FOREIGN PATENT DOCUMENTS

CN    207382213 U    5/2018
CN    209812321 U    12/2019
(Continued)

OTHER PUBLICATIONS

Shane Mitchell, et al., "An Easy-To-Implement Toolkit To Create Versatile And High-Performance HASEL Actuators For Untethered Soft Robots," Journal Article, Advanced Science 6(14):1900178, Jun. 2019, URL: https://www.researchgate.net/figure/Generalized-principle-of-zipping-mode-actuation-in-HASEL-actuators-As-voltage-is_fig1_333725822, 15 pages.
(Continued)

*Primary Examiner* — Burton S Mullins
(74) *Attorney, Agent, or Firm* — Dinsmore & Shohl LLP (57) ABSTRACT

A variable stiffening device that includes a flexible envelope having a fluid chamber, a dielectric fluid housed within the fluid chamber, and an electrode stack that includes a plurality of electrodes and one or more abrasive strips. The electrode stack is housed within the fluid chamber and is configured to receive voltage. In addition, the one or more abrasive strips are each positioned between adjacent electrodes, such that when voltage is applied to the electrode stack thereby electrostatically drawing adjacent electrodes together, the one or more abrasive strips generate frictional engagement between adjacent electrodes to actuate the variable stiffening device from a relaxed state to a rigid state.

20 Claims, 4 Drawing Sheets

(56) References Cited

U.S. PATENT DOCUMENTS

| | | | |
|---|---|---|---|
| 6,844,953 B2 * | 1/2005 | Reboa | G02B 26/0841 359/872 |
| 7,154,362 B2 * | 12/2006 | Ohnstein | B25J 9/065 335/229 |
| 7,679,261 B2 | 3/2010 | Chappaz et al. | |
| 7,813,047 B2 | 10/2010 | Wang et al. | |
| 8,125,755 B2 | 2/2012 | Garcia et al. | |
| 8,237,324 B2 * | 8/2012 | Pei | F03G 7/005 310/306 |
| 8,485,581 B2 | 7/2013 | McKnight et al. | |
| 8,779,646 B2 | 7/2014 | Hino et al. | |
| 9,602,641 B2 | 3/2017 | Kim et al. | |
| 10,233,910 B2 | 3/2019 | Mazzeo et al. | |
| 11,101,745 B2 * | 8/2021 | Mäkinen | H01H 59/0009 |
| 11,139,755 B2 * | 10/2021 | Rowe | H02N 1/002 |
| 2005/0288597 A1 | 12/2005 | Kishimoto et al. | |
| 2016/0321880 A1 | 11/2016 | Hamam et al. | |
| 2019/0126516 A1 | 5/2019 | Pikul et al. | |

FOREIGN PATENT DOCUMENTS

| | | |
|---|---|---|
| EP | 0924033 A2 | 6/1999 |
| EP | 1221180 B1 | 7/2002 |
| GB | 2563896 B | 7/2019 |
| JP | 2007097259 A | 4/2007 |
| JP | 2007097292 A | 4/2007 |
| JP | 2012044447 A | 3/2012 |
| JP | 6207478 B2 | 11/2014 |
| JP | 6102610 B2 | 3/2017 |
| KR | 20070119985 A | 12/2007 |
| KR | 20090068130 A | 6/2009 |
| KR | 20160117658 A | 10/2016 |
| WO | 2011054394 A | 5/2011 |
| WO | 2015023803 A1 | 2/2015 |
| WO | 2018175744 A1 | 9/2018 |
| WO | 2018232386 A1 | 12/2018 |
| WO | 2019002860 A1 | 1/2019 |
| WO | 2019173227 A1 | 9/2019 |

OTHER PUBLICATIONS

Ceron, et al., Fiber embroidery of self-sensing soft actuators (https://www.mdpi.com/2313-7673/3/3/24/htm). Published: Sep. 4, 2018.

Acome, et al., Hydraulically amplified self-healing electrostatic actuators with muscle-like performance, Keplinger Science, Jan. 5, 2018; vol. 359, Issue 6371, pp. 61-65.

Li, et al., Fluid-driven origami-inspired artificial muscles (https://www.pnas.org/content/114/50/13132) Published: Nov. 27, 2017.

Pikul, et al., Stretchable surfaces with programmable 3D texture morphing for synthetic amouflaging skins (https://science.sciencemag.org/content/358/6360/210). Published: Oct. 13, 2017.

Cao, et al., Development of a soft untethered robot using artificial muscle actuators (https://www.spiedigitallibrary.org/conference-proceedings-of-spie/10163/101631X/Development-of-a-soft-untethered-robot-using-artificial-muscleactuators/10.1117/12.2260375.short?SSO=1). Published: Apr. 17, 2017.

* cited by examiner

VARIABLE STIFFENING DEVICE COMPRISING ELECTRODE STACKS IN A FLEXIBLE ENVELOPE

CROSS-REFERENCE TO RELATED APPLICATIONS

This application is a continuation of U.S. patent application Ser. No. 16/778,011, filed Jan. 31, 2020, which is hereby incorporated by reference in its entirety.

TECHNICAL FIELD

The present specification generally relates to variable stiffening devices and, more specifically, to variable stiffening devices that include electrode stacks and actuate on demand.

BACKGROUND

Current variable stiffening devices use a variety of techniques to provide a device that is actuatable between a less rigid state and a more rigid state. These variable stiffening devices actuate based on the application of an external stimulus, such a temperature change or a pressure change. Some example variable stiffening devices use an external vacuum to compress layers of a device to place the device in a more rigid state. However, external vacuums require bulky equipment and operate at low efficiencies.

Accordingly, a need exists for improved variable stiffening devices that are low-profile and operate on-demand.

SUMMARY

In one embodiment, a variable stiffening device includes a flexible envelope having a fluid chamber, a dielectric fluid housed within the fluid chamber, and an electrode stack that includes a plurality of electrodes and one or more abrasive strips. The electrode stack is housed within the fluid chamber and is configured to receive voltage. In addition, the one or more abrasive strips are each positioned between adjacent electrodes, such that when voltage is applied to the electrode stack thereby electrostatically drawing adjacent electrodes together, the one or more abrasive strips generate frictional engagement between adjacent electrodes to actuate the variable stiffening device from a relaxed state to a rigid state.

In another embodiment, a variable stiffening device includes a flexible envelope having a plurality of fluid chambers each fluidically separate from one another by one or more divider portions, a dielectric fluid housed within the plurality of fluid chambers, and a plurality of electrode stacks each having a plurality of electrodes and a plurality of abrasive strips. The plurality of electrodes comprise one or more positive electrodes and one or more negative electrodes stacked in an alternating arrangement. Each electrode stack is housed within and is configured to receive voltage. In addition, an individual abrasive strip is positioned between each pair of adjacent electrodes of each of the plurality of electrode stacks such that such that when voltage is applied to the plurality of electrode stacks thereby drawing adjacent electrodes together, the plurality of abrasive strips generate frictional engagement between adjacent electrodes thereby actuating the variable stiffening device from a relaxed state to a rigid state.

In yet another embodiment, a method of actuating a variable stiffening device includes generating voltage using a voltage source electrically coupled to an electrode stack of the variable stiffening device, the variable stiffening device also including a flexible envelope that has a fluid chamber. The electrode stack includes a plurality of electrodes and one or more abrasive strips positioned between at least one pair of adjacent electrodes of the plurality of electrodes. The electrode stack is housed within the fluid chamber together with a dielectric fluid. In addition, the method includes applying voltage generated by the voltage source to the electrode stack, thereby electrostatically drawing adjacent electrodes together, such that the one or more abrasive strips generate frictional engagement between adjacent electrodes and actuate the variable stiffening device from a relaxed state to a rigid state.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments of the present disclosure are directed to variable stiffening devices that are actuatable between a relaxed state and a rigid state by applying voltage to an electrode stack of the variable stiffening device. The variable stiffening devices include a flexible envelope having one or more fluid chambers that each house a dielectric fluid and an electrode stack. The electrode stack includes a plurality of electrodes and one or more abrasive strips positioned between adjacent electrodes. When voltage is applied to the electrode stack, adjacent electrodes are electrostatically drawn together and the one or more abrasive strips grip adjacent electrodes to actuate the variable stiffening device from a relaxed state to a rigid state. The variable stiffening device provides a low profile, on-demand actuating device that may be implemented in a variety of application, such as soft robotics. Embodiments of variable stiffening devices will now be described and, whenever possible, the same reference numerals will be used throughout the drawings to refer to the same or like parts.

Figure 1:
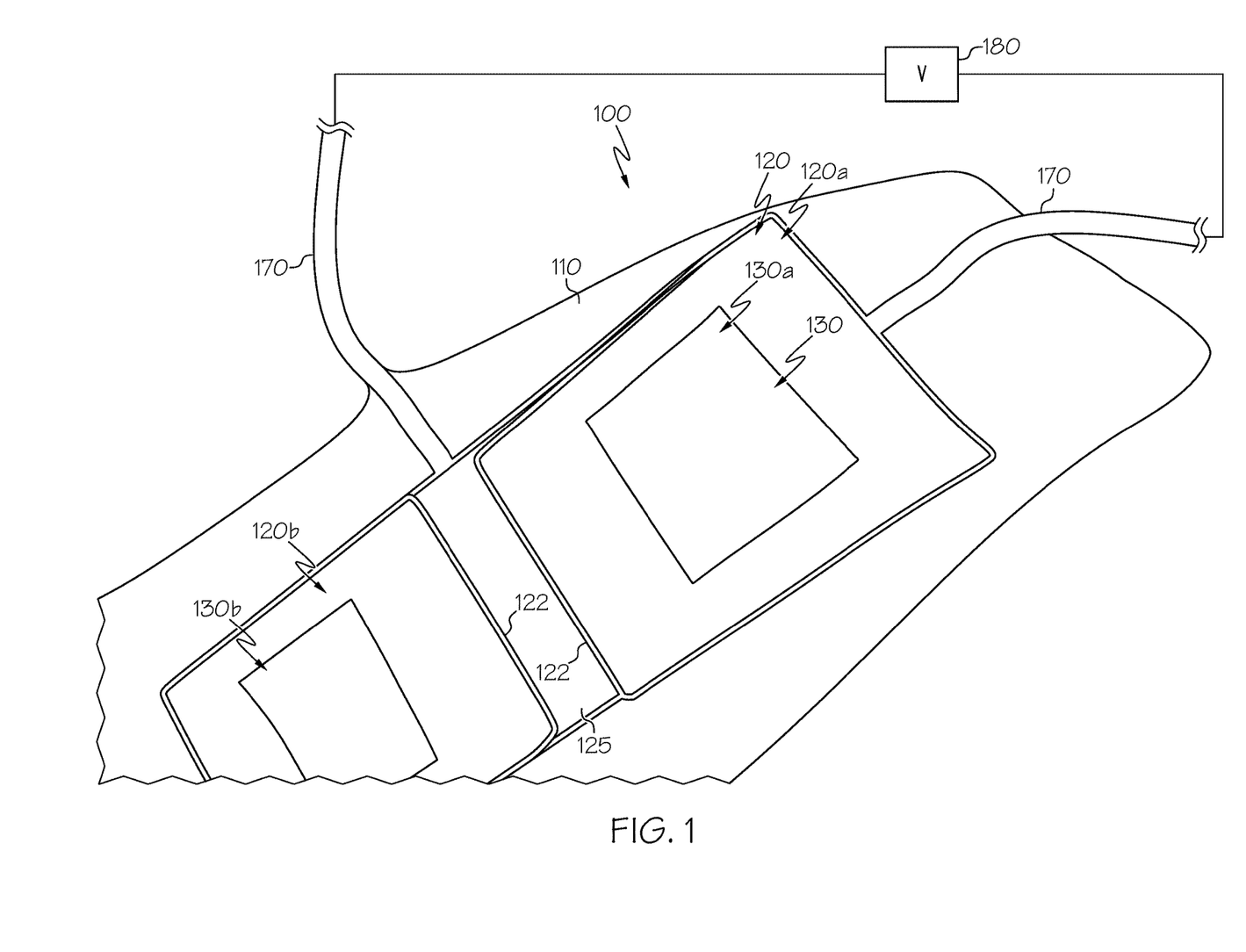
FIG. 1 depicts a schematic view of a variable stiffening device that includes one or more electrode stacks, according to one or more embodiments shown and described herein.
Figure 2A:
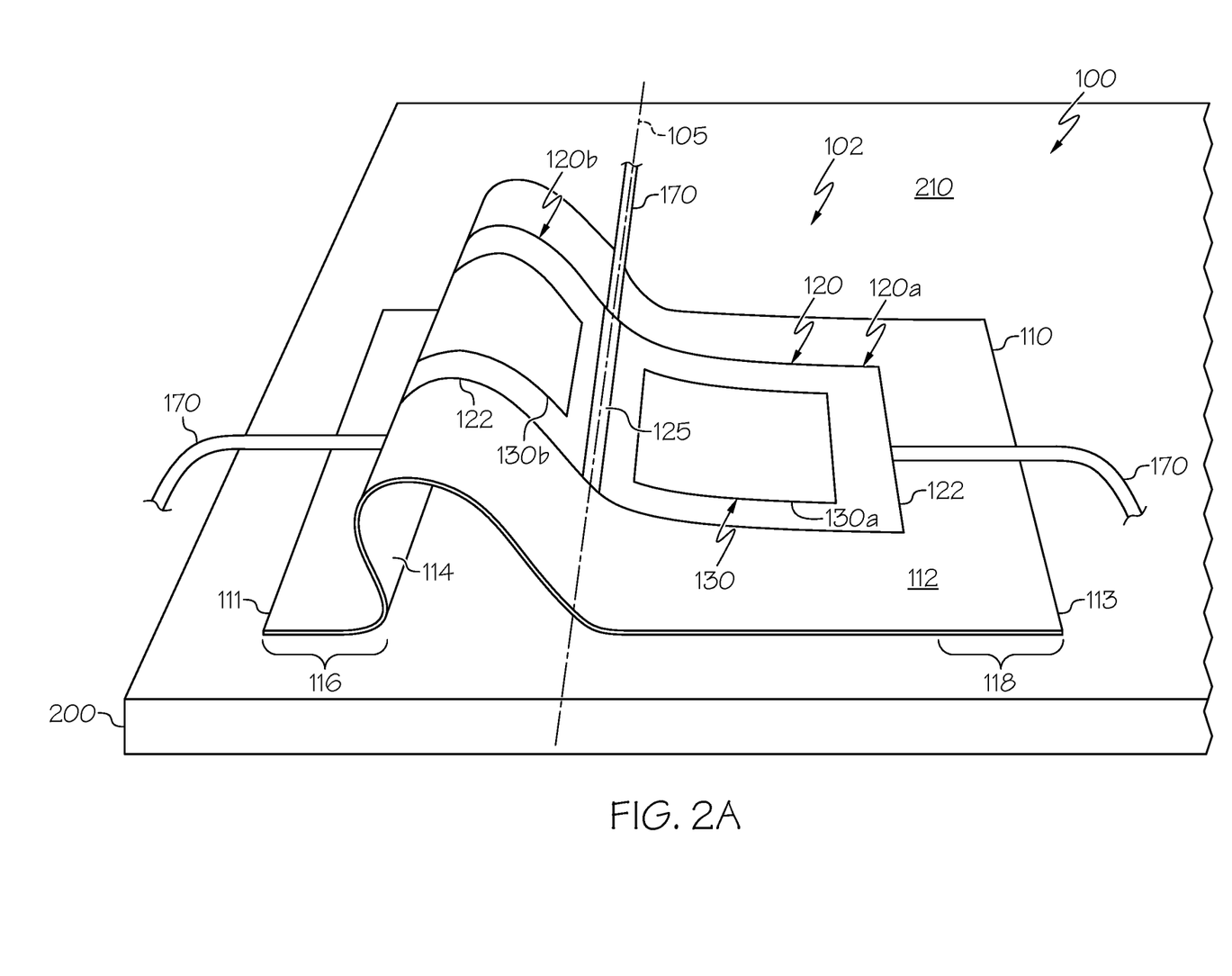
FIG. 2A depicts a schematic view of the variable stiffening device of FIG. 1 in a relaxed state, according to one or more embodiments shown and described herein.
Figure 2B:
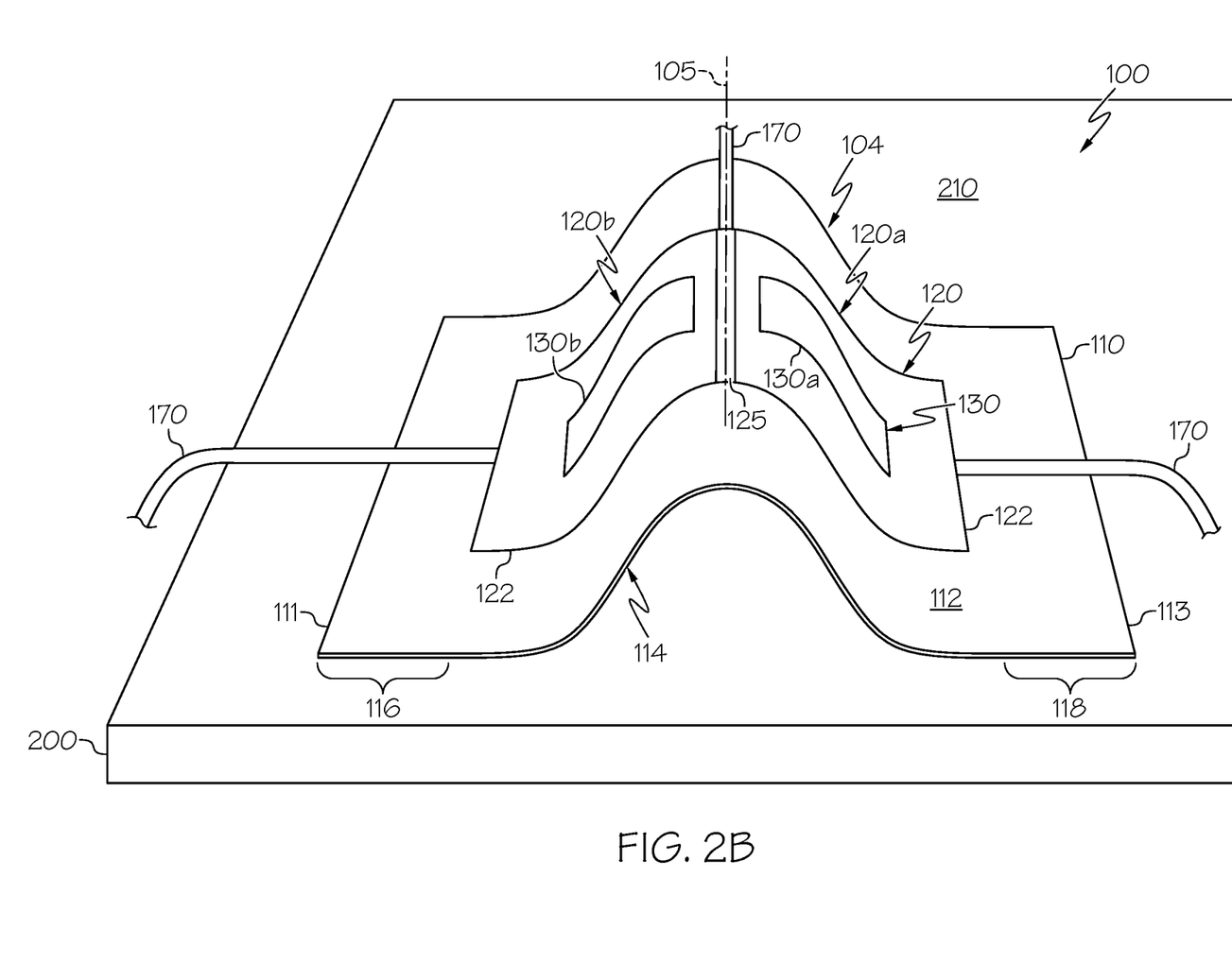
FIG. 2B depicts a schematic view of the variable stiffening device of FIG. 1 in a rigid state, according to one or more embodiments shown and described herein.
Figure 3:
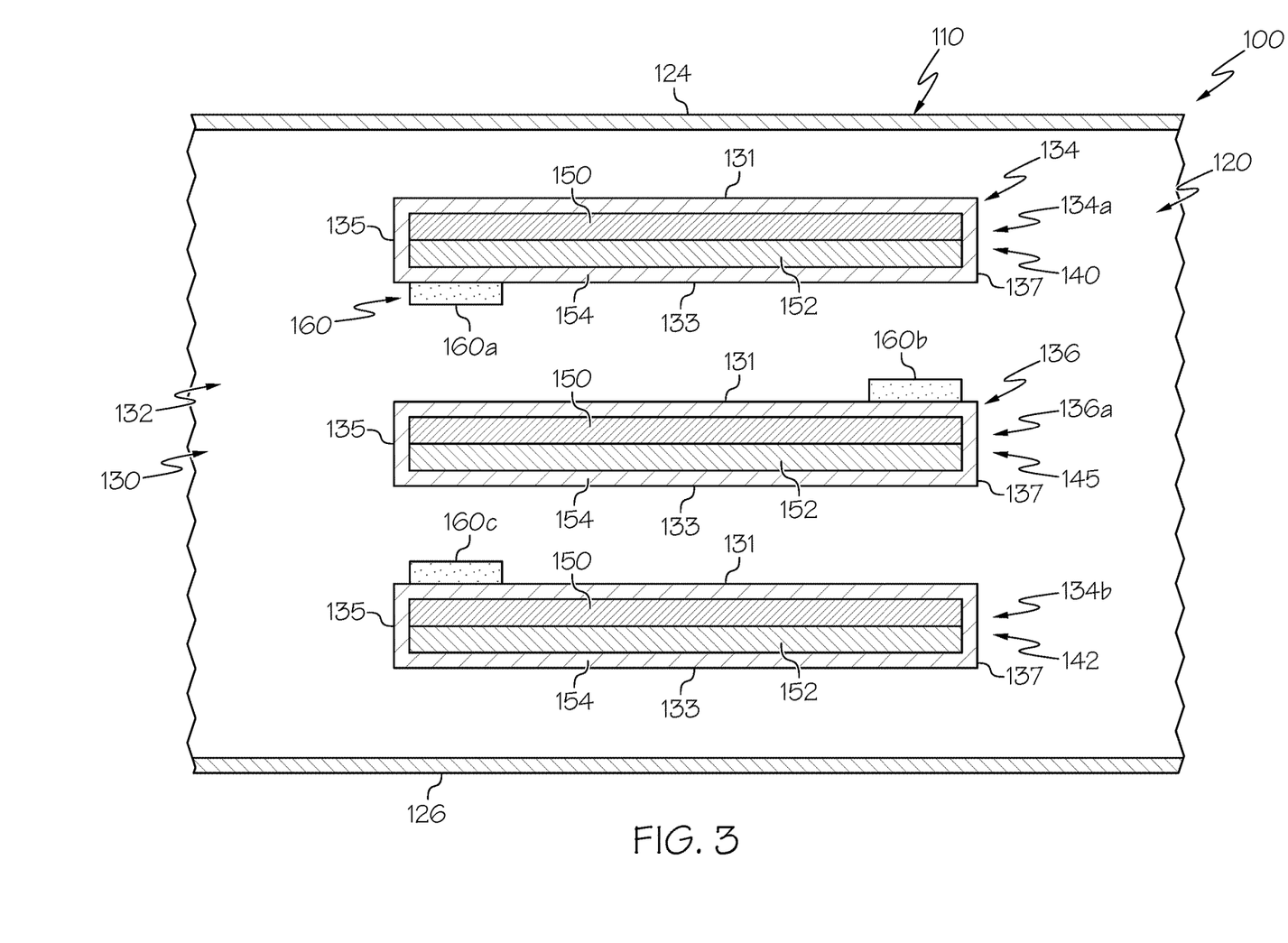
FIG. 3 depicts a cross section of an example electrode stack of the variable stiffening device of FIGS. 1 and 2, according to one or more embodiments shown and described herein.

Referring now to FIGS. 1-3, a variable stiffening device 100 including a flexible envelope 110 having one or more fluid chambers 120 and one or more electrode stacks 130 is schematically depicted. Each electrode stack 130 is housed within an individual fluid chamber 120. Further, each electrode stack 130 comprises a plurality of electrodes 132 and one or more abrasive strips 160 positioned between adjacent electrodes 132. The plurality of electrodes 132 of each electrode stack 130 include one or more positive electrodes 134 and one or more negative electrodes 136 stacked in an alternating arrangement. The electrode stack 130 of the variable stiffening device 100 is electrically coupled to a voltage source 180, for example, using leads 170. In operation, applying voltage generated by the voltage source 180 to the electrode stack 130 forms an electrical potential across adjacent positive electrodes 134 and negative electrodes 136 of the electrode stack 130. This electrical potential causes electrostatic attraction between adjacent electrodes 132 (i.e., adjacent positive and negative electrodes 134, 136) drawing adjacent electrodes 132 together.

Referring still to FIGS. 1-3, the flexible envelope 110 comprises a flexible polymer material, such as silicone. The one or more fluid chambers 120 of the flexible envelope 110 may be a plurality of fluid chambers 120 each fluidically separated from one another by a divider portion 125. For example, in the embodiment depicted in FIGS. 1-2B, the flexible envelope 110 comprises a first fluid chamber 120a and a second fluid chamber 120b fluidically separated from one another by the divider portion 125. In addition, embodiments of the variable stiffening device 100 comprising a plurality of fluid chambers 120 may also comprise a plurality of electrode stacks 130, each disposed in a separate fluid chamber 120. For example, in the embodiment depicted in FIGS. 1-2B, a first electrode stack 130a is disposed in the first fluid chamber 120a and a second electrode stack 130b disposed in the second fluid chamber 120b.

The flexible envelope 110 comprises a first end 111 opposite a second end 113 and a central axis 105 bisecting the flexible envelope 110. In addition, the flexible envelope 110 comprises a first surface 112 opposite a second surface 114. In some embodiments, the divider portion 125 is positioned along the central axis 105 such that the first fluid chamber 120a and the first electrode stack 130a are located between the central axis 105 and the first end 111 and the second fluid chamber 120b and the second electrode stack 130b are located between the central axis 105 and the second end 113. Moreover, while the embodiments in FIGS. 1-2B depict two fluid chambers 120 and two electrode stacks 130, it should be understood that embodiments are contemplated with a single fluid chamber 120 and embodiments are contemplated with greater than two fluid chambers 120. Indeed, the arrangement of fluid chambers 120 and electrode stacks 130 depicted in FIGS. 1-2B is one example arrangement, and other arrangements are contemplated.

In addition to an electrode stack 130, each fluid chamber 120 houses a dielectric fluid. Without intending to be limited by theory, dielectric fluid is a medium or material that transmits electrical force with minimal to no conduction and as such has low electrical conductivity. Some non-limiting example dielectric fluids include perfluoroalkanes, transformer oils, and deionized water. The dielectric fluid minimizes unwanted electrical discharges (i.e., shorts) between electrodes 132. In addition, the dielectric fluid is disposed between the adjacent electrodes 132 when the variable stiffening device 100 is in a relaxed state 102. When voltage is applied to the electrode stack 130, drawing the electrodes 132 of the electrode stack 130 together to actuate the variable stiffening device 100 into the rigid state 104, the dielectric fluid is pushed into the remaining portion of the flexible envelope 110.

Referring still to FIGS. 1-3, each fluid chamber 120 comprises a perimeter 122. The perimeter 122 may comprise a seal, seam, or the like, such that the perimeter 122 prevents dielectric fluid from transferring between adjacent fluid chambers 120. In some embodiments, as depicted in FIGS. 1-2B, each fluid chamber 120 comprises a distinct perimeter 122 and the divider portion 125 comprises the portion of the flexible envelope 110 between the perimeters 122 of adjacent fluid chambers 120. In other embodiments, the adjacent fluid chambers 120 share a portion of their respective perimeters 122 and this shared portion operates as the divider portion 125.

Referring now to FIG. 3, a cross section of an example electrode stack 130 disposed in an example fluid chamber 120 is schematically depicted. The electrode stack 130 comprises a first end electrode 140 and a second end electrode 142. In addition, the electrode stack comprises one or more interior electrodes 145 positioned between the first end electrode 140 and the second end electrode 142, which in the embodiment depicted in FIG. 3 is the first negative electrode 136a. Each electrode 132 comprises a first surface 131 opposite a second surface 133 and a first end 135 opposite a second end 137. The first surface 131 of each electrode 132 is oriented towards a first wall 124 of the fluid chamber 120 and the second surface 133 of each electrode 132 is oriented towards a second wall 126 of the fluid chamber 120. In some embodiments, the plurality of electrodes 132 are rectilinear. In these embodiments, the first and second ends 135, 137 are opposite sides or edges of the electrodes 132. In other embodiments, the plurality of electrodes 132 are cylindrical or otherwise rounded. In these embodiments, the first end 135 is diametric the second end 137. As used herein, "diametric" refers to two points along the perimeter of an individual electrode 132 that are each within 10° of an antipodal position of the other.

The first end electrode 140 forms one end of the electrode stack 130. In particular, the first end electrode 140 is positioned between the first wall 124 of the fluid chamber 120 and the one or more interior electrodes 145. The second end electrode 142 is opposite the first end electrode 140 and forms another end of the electrode stack 130. In particular, the second end electrode 142 is positioned between the second wall 126 of the fluid chamber 120 and the one or more interior electrodes 145. In some embodiments, the first wall 124 is a portion of the first surface 112 of the flexible envelope 110 and the second wall 126 is a portion of the second surface 114 of the flexible envelope 110, as shown in FIG. 3.

As noted above, the plurality of electrodes 132 of each electrode stack 130 include one or more positive electrodes 134 and one or more negative electrodes 136 stacked in an alternating arrangement. Thus, each interior electrode 145 that is a positive electrode 134 is adjacent to two negative electrodes 136 and each interior electrode 145 that is a negative electrode 136 is adjacent to two positive electrodes 134. Furthermore, the first end electrode 140 is adjacent the first wall 124 and an individual interior electrode 145 of the opposite charge and the second end electrode 142 is adjacent the second wall 126 and an individual interior electrode 145 of the opposite charge. Indeed, the example electrode stack 130 depicted in FIG. 3 comprises a first positive electrode 134a (i.e., the first end electrode 140), a second positive electrode 134b (i.e., the second end electrode 142), and a first negative electrode 136a (i.e., an interior electrode 145) positioned between the first positive electrode 134a and the second positive electrode 134b. While three electrodes 132 are depicted in FIG. 3, it should be understood that the electrode stack 130 may comprise additional positive electrodes 134 and negative electrodes 136 stacked in an alternating arrangement.

In some embodiments, adjacent electrodes 132 of the electrode stack 130 are physically coupled to one another, for example, along an edge of each electrode 132, such as an alternating edge. In other embodiments, the electrodes 132 of the electrode stack 130 are positioned together without physical coupling between adjacent electrodes 132. In addition, in some embodiments, the first end electrode 140 is physically coupled to the first wall 124 of the fluid chamber 120 and the second end electrode 142 is physically coupled to the second wall 126 of the fluid chamber 120. For example, the first end electrode 140 and the second end electrode 142 may coupled to the first wall 124 and the second wall 126, respectively, using an adhesive. In other embodiments, the electrodes 132 of the electrode stack 130 are positioned together without physical coupling to the first wall 124 or the second wall 126.

Each electrode 132 comprises a flexible metal film 152 surrounded by a polymer cover coating 154. In some embodiments, each electrode 132 also comprises an inner polymer film 150 coupled to the flexible metal film 152 to function as backing for the flexible metal film 152. Both the inner polymer film 150 and the flexible metal film 152 may be surrounded by the polymer cover coating 154. In some embodiments, the inner polymer film 150 comprises polyester and the flexible metal film 152 comprises aluminum or copper. However, it should be understood that any suitable polymers and metals for forming an electrode are contemplated. In addition, it should be understood that additional interlayers may be positioned between the inner polymer film 150 and the flexible metal film 152. The polymer cover coating 154, which is wrapped around the inner polymer film 150 and the flexible metal film 152, comprises a different polymer than the inner polymer film 150. For example, in some embodiments, the polymer cover coating 154 comprises a polyimide. In addition, the thickness of a single electrode 132 may be in a range of from about 0.025 millimeters (mm) to 1 mm, such as from 0.1 mm to 1 mm, from 0.2 mm to 1 mm, or the like, for example, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or any range having any two of these values as endpoints.

Referring still to FIG. 3, the one or more abrasive strips 160 of the electrode stack 130 are positioned between adjacent electrodes 132. Each abrasive strip 160 may be coupled to a surface (i.e., a first surface 131 or a second surface 133) of an individual electrode 132 that faces an adjacent electrode 132, for example, using an adhesive. As one example, the one or more abrasive strips 160 may comprise sandpaper. However, it should be understood that any abrasive, high friction material is contemplated. In operation, when adjacent electrodes 132 (i.e., adjacent positive and negative electrodes 134, 136) are electrostatically drawn together, the one or more abrasive strips 160 generate frictional engagement between adjacent electrodes 132. This stiffens the electrode stack 130 and actuates the variable stiffening device 100 from a relaxed state 102, as shown in FIG. 2A, to a rigid state 104, as shown in FIG. 2B.

At least one abrasive strip 160 is positioned between each pair of adjacent electrodes 132. In the example illustrated in FIG. 3, the one or more abrasive strips 160 comprise a first abrasive strip 160a coupled to the first end electrode 140 (i.e., the first positive electrode 134a), a second abrasive strip 160b coupled to the interior electrode 145 (i.e., the first negative electrode 136a), and a third abrasive strip 160c coupled to the second end electrode 142 (i.e., the second positive electrode 134b). The first abrasive strip 160a is coupled to the second surface 133 of the first end electrode 140 facing the first surface 131 of the interior electrode 145, the second abrasive strip 160b is coupled to the first surface 131 of the interior electrode 145 facing the second surface 133 of the first end electrode 140, and the third abrasive strip 160c is coupled to the first surface 131 of the second end electrode 142 facing the second surface 133 of the interior electrode 145. While the electrode stack 130 depicted in FIG. 3 comprises the same number of individual electrodes 132 and abrasive strips 160, it should be understood that embodiments are contemplated comprising a greater number of abrasive strips 160 than electrodes 132. For example, in some embodiments, some or all of the interior electrodes 145 may comprise at least one abrasive strip 160 coupled to their first surface 131 and at least one abrasive strip 160 coupled to their second surface 133.

Moreover, in some embodiments, each of the plurality of abrasive strips 160 are coupled to the first surface 131 or the second surface 133 of an individual electrode 132 at a location closer to either the first end 135 or the second end 137 of the individual electrode 132. In other words, the abrasive strips 160 may be coupled to the first surface 131 or the second surface 133 in an offset orientation. In some embodiments, this offset alternates such that each successive abrasive strip 160 from the first end electrode 140 to the second end electrode 142 is coupled closer to alternating ends of individual electrodes 132. In other words, the plurality of abrasive strips 160 may be arranged in an alternating offset orientation. Indeed, this is depicted in FIG. 3, in which the first abrasive strip 160a is closer to the first end 135 of the first end electrode 140a, the second abrasive strip 160b is closer to the second end 137 of the interior electrode 140b, and the third abrasive strip 160c is closer to the first end 135 of the second end electrode 142. Without intending to be limited by theory, alternating the positioning of the abrasive strips 160 throughout the electrode stack 130 increases the rigidity of the electrode stack 130 when the variable stiffening device 100 is actuated into the rigid state 104.

Referring now to FIGS. 2A and 2B, the variable stiffening device 100 may be actuated by applying a voltage generated by the voltage source 180 to the electrode stack 130. In particular, voltage may be generated by the voltage source 180 and applied to the plurality of electrodes 132 of the electrode stack 130, thereby electrostatically drawing adjacent positive and negative electrodes 134, 136, together. While not intending to be limited by theory, applying negative voltage to the negative electrodes 136 of the electrode stack 130 and applying positive voltage to the positive electrodes 134 of the electrode stack 130 forms an electrical potential across the alternating positive electrodes 134 and negative electrodes 136, electrostatically drawing the electrodes 132 of the electrode stack 130 together.

When the electrodes 132 of the electrode stack 130 are electrostatically drawn together, the abrasive strips 160 generate frictional engagement between adjacent electrodes 132 such that the electrode stack 130 stiffens and is retained together. The combination of electrostatic attraction between adjacent electrodes 132 and the frictional engagement between adjacent electrodes 132 actuates the variable stiffening device 100 from the relaxed state 102 to the rigid state 104. Once the variable stiffening device 100 is actuated into the rigid state 104, continued application of voltage to the electrode stack 130 holds the variable stiffening device 100 in the rigid state 104. Further, removing voltage from the electrode stack 130 removes the electrostatic attraction from adjacent positive and negative electrodes 134, 136, such that the variable stiffening device 100 relaxes from the rigid state 104 to the relaxed state 102. This allows adjacent electrodes 132 to move apart freely and allows dielectric fluid to fill the spaces between adjacent electrodes 132.

Referring still to FIGS. 2A and 2B, in one example operation, the variable stiffening device 100 may form a tent structure when actuated into the rigid state 104. In FIGS. 2A and 2B, the variable stiffening device 100 is positioned on a surface 210 of a support structure 200. Portions of the second surface 114 of the flexible envelope 110 may be coupled to the surface 210 of the support structure 200. For example, a portion 116 at the first end 111 of the flexible envelope 110 and a portion 118 at the second end 113 of the flexible envelope 110 may each be coupled to the surface 210 of the support structure 200. In particular, the portions 116, 118 may be coupled to the support structure 200, such that there is slack in the flexible envelope 110 when in the relaxed state 102, as shown in FIG. 2A. Slack may be achieved by coupling the portions 116, 118 of the first surface 112 of the flexible envelope 110 to locations on the surface 210 of the support structure 200 that are closer to one another than the distance from the first end 111 to the second end 113 of the flexible envelope 110.

In this example operation, when voltage is applied to the first electrode stack 130a and the second electrode stack 130b, thereby actuating the variable stiffening device into the rigid state 104, the divider portion 125 of the flexible envelope 110 is lifted above the surface 210 of the support structure 200. Indeed, in embodiments in which the divider portion 125 of the flexible envelope 110 is positioned along the central axis 105, the divider portion 125 of the flexible envelope 110 forms an actuated peak of the variable stiffening device 100, which is the portion of the flexible envelope 110 farthest from the surface 210 of the support structure 200. It should be understood that this example operation is merely illustrative and the variable stiffening device 100 may be used in a variety of soft robotics applications. For example, the variable stiffening device 100 may operate as a selective locking device, a switching device, and/or an artificial muscle that facilitates one or more of a lifting motion, grasping motion, pushing motion, pulling motion, or the like.

It should now be understood that embodiments described herein are directed to variable stiffening devices that include a flexible envelope having one or more fluid chambers that each house a dielectric fluid and an electrode stack. The electrode stack includes a plurality of electrodes and one or more abrasive strips positioned between adjacent electrodes. The variable stiffening device is actuatable between a relaxed state and a rigid state by applying voltage to an electrode stack of the variable stiffening device. In particular, when voltage is applied to the electrode stack, adjacent electrodes are electrostatically drawn together and the one or more abrasive strips grip adjacent electrodes to place the variable stiffening device into a rigid state. The variable stiffening device provides a low profile, on-demand actuating device that may be implemented in a variety of application, such as soft robotics.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A variable stiffening device comprising:
   an envelope comprising a fluid chamber;
   a dielectric fluid housed within the fluid chamber; and
   an electrode stack comprising a plurality of electrodes, wherein:
      the electrode stack is housed within the fluid chamber and is configured to receive voltage, the dielectric fluid in contact with a surface of each electrode of the plurality of electrodes, the surface facing an adjacent electrode of the plurality of electrodes; and
      when voltage is applied to the electrode stack thereby electrostatically drawing adjacent electrodes together, the electrodes actuate the variable stiffening device from a relaxed state to a rigid state.

2. The variable stiffening device of claim 1, wherein the fluid chamber is a first fluid chamber and the variable stiffening device further comprises a second fluid chamber fluidically separated from the first fluid chamber by a divider portion.

3. The variable stiffening device of claim 2, wherein the divider portion is positioned along a central axis of the flexible envelope.

4. The variable stiffening device of claim 2, wherein the electrode stack is a first electrode stack and the variable stiffening device further comprises a second electrode stack disposed within the second fluid chamber.

5. The variable stiffening device of claim 1, wherein the plurality of electrodes comprise one or more positive electrodes and one or more negative electrodes stacked in an alternating arrangement.

6. The variable stiffening device of claim 1, wherein the plurality of electrodes each comprise a flexible metal film surrounded by a polymer cover coating.

7. The variable stiffening device of claim 6, wherein the plurality of electrodes further comprise an inner polymer film coupled to the flexible metal film such that the polymer cover coating surrounds the flexible metal film and the inner polymer film.

8. The variable stiffening device of claim 1, wherein the electrode stack comprises one or more connective strips that are each positioned between adjacent electrodes, the one or more connective strips comprise a plurality of connective strips arranged in an alternating offset orientation.

9. The variable stiffening device of claim 1, wherein the electrode stack comprises one or more connective strips that are each positioned between adjacent electrodes, the one or more connective strips comprise a plurality of connective strips and at least one connective strip is positioned between at least one pair of adjacent electrodes of the electrode stack.

10. The variable stiffening device of claim 1, wherein the electrode stack comprises one or more connective strips that are each positioned between adjacent electrodes, the one or more connective strips comprise a material that increases a sheer force between the adjacent electrodes when in contact with the adjacent electrodes.

11. A variable stiffening device comprising:
an envelope comprising a plurality of fluid chambers each fluidically separate from one another by one or more divider portions;
a dielectric fluid housed within the plurality of fluid chambers; and
a plurality of electrode stacks each comprising a plurality of electrodes and a plurality of connective strips; wherein:
the plurality of electrodes comprise one or more positive electrodes and one or more negative electrodes stacked in an alternating arrangement; and
an individual connective strip is positioned between each pair of adjacent electrodes of each of the plurality of electrode stacks.

12. The variable stiffening device of claim 11, wherein at least one of the one or more divider portions is positioned along a central axis of the flexible envelope.

13. The variable stiffening device of claim 11, wherein the plurality of electrodes each comprise a flexible metal film coupled to an inner polymer film and a polymer cover coating surrounding the flexible metal film and the inner polymer film.

14. The variable stiffening device of claim 11, wherein the plurality of connective strips are arranged in an alternating offset orientation.

15. The variable stiffening device of claim 11, wherein the one or more connective strips comprise a material that increases a sheer force between the adjacent electrodes when in contact with the adjacent electrodes.

16. A method of actuating a variable stiffening device, the method comprising:
generating voltage using a voltage source electrically coupled to an electrode stack of the variable stiffening device, the variable stiffening device further comprising an envelope that comprises a fluid chamber; wherein:
the electrode stack comprises a plurality of electrodes; and
the electrode stack is housed within the fluid chamber together with a dielectric fluid, the dielectric fluid is in contact with a surface of each electrode of the plurality of electrodes, the surface facing an adjacent electrode of the plurality of electrodes; and
applying voltage generated by the voltage source to the electrode stack, thereby electrostatically drawing adjacent electrodes together to actuate the variable stiffening device from a relaxed state to a rigid state.

17. The method of claim 16, further comprising removing voltage from the electrode stack, thereby removing electrostatic attraction between adjacent electrodes.

18. The method of claim 16, wherein:
the fluid chamber is a first fluid chamber and the variable stiffening device further comprises a second fluid chamber fluidically separated from the first fluid chamber by a divider portion; and
the electrode stack is a first electrode stack and the variable stiffening device further comprises a second electrode stack disposed within the second fluid chamber.

19. The method of claim 18, wherein:
the flexible envelope comprises a first surface opposite a second surface; and
portions of the second surface at both a first end and a second end of the flexible envelope are coupled to a support structure, such that when the variable stiffening device is in the rigid state, the divider portion of the flexible envelope is lifted above the support structure to form an actuated peak of the variable stiffening device.

20. The method of claim 16, wherein the electrode stack comprises one or more connective strips positioned between at least one pair of adjacent electrodes of the plurality of electrodes, the one or more connective strips comprise a material that increases a sheer force between the adjacent electrodes when the adjacent electrodes are electrostatically drawn together.

* * * * *

UNITED STATES PATENT AND TRADEMARK OFFICE
CERTIFICATE OF CORRECTION

| | |
|---|---|
| PATENT NO. | : 11,689,119 B2 |
| APPLICATION NO. | : 17/465951 |
| DATED | : June 27, 2023 |
| INVENTOR(S) | : Michael P. Rowe |

It is certified that error appears in the above-identified patent and that said Letters Patent is hereby corrected as shown below:

In the Specification

In Column 5, Line(s) 15, delete "may coupled" and insert --may be coupled--, therefor.

Signed and Sealed this
First Day of August, 2023

*Katherine Kelly Vidal*

Katherine Kelly Vidal
*Director of the United States Patent and Trademark Office*